United States Patent [19] [11] 3,721,727
Gustison [45] March 20, 1973

[54] ELECTRIC FURNACE METHOD OF BENEFICIATING TANTALUM-AND NOIBIUM-CONTAINING TIN SLAGS AND THE LIKE

[75] Inventor: Robert A. Gustison, Reading, Pa.

[73] Assignee: Kawecki Berylco Industries, Inc., New York, N.Y.

[22] Filed: Sept. 9, 1971

[21] Appl. No.: 179,191

[52] U.S. Cl. ............................423/62, 75/24, 75/84
[51] Int. Cl. ............................................C22b 59/00
[58] Field of Search ....................423/62; 75/24, 84

[56] References Cited

UNITED STATES PATENTS

| | | | |
|---|---|---|---|
| 2,140,801 | 12/1938 | Leemans | 423/62 |
| 2,441,768 | 5/1948 | Jordan | 75/24 X |
| 3,300,297 | 1/1967 | Fields | 75/24 |
| 3,389,957 | 6/1968 | Olds et al. | 423/62 |
| 3,447,894 | 6/1969 | Gustison et al. | 423/68 |
| 3,585,024 | 6/1971 | Bermerazzo et al. | 75/24 |

*Primary Examiner*—Herbert T. Carter
*Attorney*—Dean S. Edmonds et al.

[57] ABSTRACT

Tin slags containing recoverable amounts of tantalum and niobium are beneficiated with respect to these components by subjecting the slag first to a carbiding treatment followed by a two-stage oxidation treatment in the first stage of which a metal oxide is used to selectively oxidize carbided components of the slag other than the tantalum and niobium and in the second stage of which the carbided tantalum and niobium are re-oxidized to form a product slag which can be substituted for tantalum and niobium ores in methods for the recovery of these metals.

6 Claims, No Drawings

ELECTRIC FURNACE METHOD OF BENEFICIATING TANTALUM-AND NOIBIUM-CONTAINING TIN SLAGS AND THE LIKE

This invention relates to the treatment of tin slags and other metallurgical by-products and, more particularly, to the beneficiation of the tantalum and niobium content of tin slags and other metallurgical by-products containing these constituents.

Several approaches have been made to the beneficiation of the tantalum and niobium content of tin slags to make them amenable to tantalum and niobium recovery operations applicable to the treatment of tantalum and niobium ores. One such approach has been to roast the slag with caustic potash, but the product of this roast is difficult to handle because of its viscous nature and is difficult to leach to obtain the desired beneficiation. A related approach has been to subject the slag to high temperature digestion with an aqueous caustic soda solution under superatmospheric pressure, but the large volume of solution required for this purpose tends to carry away a considerable amount of the tantalum and niobium and requires a large amount of acid to neutralize the caustic. A wholly different approach has been to smelt the tin slag with carbon to separate much of the gangue components of the tin slag and then to oxidize the tantalum- niobium- and carbon-containing hearth product either by melting it with iron oxide or by roasting it in air. Both of these oxidation products contain all of the gangue constituents present in the carbidic hearth product such as silica, titania, lime, magnesia and alumina. In a modification of this process described and claimed in U. S. Pat. No. 3,447,894, the carbidic hearth product was oxidized by exothermic fusion with sodium nitrate followed by a water leach to remove excess soda and other water-soluble sodium salts such as sodium silicate and sodium tungstate. The insoluble residue from the water leach was then subjected to a mineral acid leach to dissolve the calcium, iron, magnesium, manganese and sodium components of the leached solids. This approach, as is true of all the approaches involving aqueous leaching, requires that the waste streams be neutralized and filtered before discharge to the environment.

I have now devised a method of beneficiating the tantalum and niobium contents of iron-containing tin slags or other metallurgical by-products which is characterized by the use of inexpensive reagents, does not produce aqueous waste streams and exhibits excellent beneficiation with high recovery of the tantalum and niobium components of the slag. The beneficiation method of my invention comprises heating the tin slag in the presence of sufficient carbon to convert its tantalum and niobium oxides to a primary hearth product containing the tantalum and niobium as carbides in admixture with a carbon-containing iron alloy, separating oxidic gangue constituents from said primary hearth product, reacting said primary hearth product with a controlled amount of a selective oxidation reagent comprising a metal oxide having a free energy of formation more positive than that of silica such as to oxidize any reduced titanium, silicon, calcium, aluminum and magnesium components of the tin slag present in the primary hearth product and to produce a beneficiated secondary hearth product containing the carbided tantalum and niobium components of the primary hearth product, separating slagged oxidic gangue constituents from the resulting secondary hearth product, and then subjecting the secondary hearth product in a melting operation to the action of a final oxidizing reagent capable of oxidizing the tantalum and niobium of the secondary hearth product into a final product slag containing the tantalum and niobium in the form of their pentoxides.

These and other novel features of the invention will be more readily understood from the following description and examples.

The following approximate composition is that of a Malaysian tin slag expressed as oxides;

|  | Percent |  | Percent |
| --- | --- | --- | --- |
| $Ta_2O_5$ | 4 | $Al_2O_3$ | 9 |
| $Nb_2O_5$ | 4 | $WO_3$ | 8 |
| $Fe_2O_3$ | 11 | $ZrO_2$ | 3 |
| $SiO_2$ | 21 | $MgO$ | 0.5 |
| $CaO$ | 25 | $MnO_2$ | 0.5 |
| $TiO_2$ | 11 | $SnO$ | 0.5 |
|  |  | $V_2O_5$ | 0.5 |

Tantalum- and niobium-bearing tin slags of this composition and other tin slags, as well as other tantalum- and niobium-containing metallurgical by-products, are all amenable to the beneficiation method of my invention.

The beneficiation is effected first by a carbon reduction of at least the tantalum, niobium and iron components of the slag. Although this primary smelting step can be effected by mixing the ground slag with powdered anthracite, pelletizing the mixture and then heating the mixture in a kiln, I presently prefer to effect it by smelting in an electric arc furnace. The tin slag to be smelted, together with sufficient carbon to reduce the iron, tantalum and niobium components of the slag, is charged to an electric arc furnace, advantageously of the tilting type, and is smelted to form a primary hearth product and a supernatant slag. The resulting smelter slag, comprising most of the silica, titania, alumina, lime and magnesia of the tin slag charge, is poured out of the furnace at a temperature of about 1300°–1700 °C. Pouring is stopped when the hearth product approaches the pouring lip. The primary hearth product, comprising the tantalum, niobium, iron, tin and tungsten, primarily as carbides and metals, as well as reduced species of some of the silicon, titanium and aluminum components of the tin slag and some entrapped smelter slag, is raked out of the furnace while at a temperature of about 1400°–1800°C. This slag is discarded and the hearth product is crushed to prepare it for subsequent treatment. The crushed hearth product is advantageously further upgraded by passing it over a magnetic pulley. The non-magnetic fraction is preferably returned to the smelting operation.

The magnetic fraction of the primary hearth product is then subjected to a selective oxidizing melting operation in an electric arc furnace which is an important feature of my beneficiating method. The order of stability of the metal oxides present in the primary hearth product is:

| compound | Free energy of formation at 2000°K. (kcal/gram-atom of oxygen |
| --- | --- |
| CaO | –99 |

| | |
|---|---|
| Al₂O₃ | −83 |
| MgO | −75 |
| TiO₂ | −70 |
| SiO₂ | −62 |
| Ta₂O₅ | −56 |
| Nb₂O₅ | −53 |
| FeO | −32 |
| WO₃ | −30 |
| SnO₂ | −20 |

The metal or metal carbide of any metal oxide in the foregoing table will be oxidized by any metal oxide below it, and this metal oxide will in turn be reduced, the order of oxidation preference being related to the free energy of formation of the oxide. For example, FeO will oxidize niobium, tantalum, silicon titanium, magnesium, aluminum and calcium and will in turn be reduced to metallic iron. Taking advantage of this relationship, I have discovered that I can selectively separate, as a slag, the gangue components, such as CaO, Al₂O₃, MgO, TiO₂ and SiO₂, from the primary hearth product, and thus effect a beneficiation of the primary hearth product, by adding to the primary hearth product a controlled amount of an oxidant in the form of a metal oxide having a free energy of formation more positive than that of silica and by melting this mixture. Oxides of such metals as tantalum, niobium, iron, tungsten and tin can be used and are added in amount sufficient to effect oxidation of those gangue constituents positioned above Ta₂O₅ in the foregoing table. The further addition of a fluxing agent such as lime or fluorspar is helpful but not generally essential in making this selective separation. The resulting slag is either discarded or is recycled back to the primary step if the concentration of niobium or tantalum warrants. The resulting beneficiated secondary hearth product, comprising the tantalum, niobium, iron, tin and tungsten in the form of the metal or its carbide, or both, is raked out of the furnace while at a temperature of about 1400°–1800°C. The secondary hearth product is crushed to prepare it for subsequent treatment. Prior to this subsequent treatment, however, the crushed product is advantageously upgraded by passing it over a magnetic pulley, the non-magnetic fraction preferably being returned to the immediately preceding selective oxidation operation.

The beneficiated secondary hearth product can be oxidized with a controlled amount of oxygen or by mixing with it a sufficient quantity of an oxidizing agent, such as iron oxide, which is capable of completely oxidizing the tantalum and niobium components of the secondary hearth product and is subjected to a third (final) melting operation, advantageously in an electric arc furnace, whereby the desired tantalum and columbium report to the slag as oxides. The resulting metallic phase will contain most of the iron, tungsten and tin components of the secondary hearth product plus any metal component of the oxidant used in the smelting step.

The following specific examples of my beneficiation method are illustrative, but not limitative, of the practice of the invention:

A. Primary Smelting Operation

To a tilting electric arc furnace there was charged 8,000 pounds of Malaysian tin slag and 1,120 pounds of coke crushed to ¼ inch and smaller. The charge was smelted to form about 2,900 pounds of a primary hearth product and about 4,500 pounds of supernatant slag. The furnace was tilted to pour off the slag at a temperature of about 1550°C. and pouring was stopped when the sliding hearth product, at a temperature of about 1700°C., reached the pouring lip. The hearth product was raked into a ladle where it was allowed to cool. The slag product composition, expressed as oxides, contained about 1.6% TiO₂, 19% Al₂O₃, 46% CaO, 32% SiO₂ and 1.6% MgO. The primary hearth product, after crushing to ⅛ inch and smaller and magnetic separation, appeared to contain the tantalum, niobium and at least some of the titanium as carbides, the balance of the titanium as oxide, the tungsten as metal or carbide, the silicon principally as ferrosilicon, and a considerable amount of occluded slag. The hearth product analyzed as follows:

| Component | Percent | Expressed As |
|---|---|---|
| Ta | 9.7 | Ta₂O₅ |
| Nb | 11.2 | Nb₂O₅ |
| Ti | 11.0 | TiO₂ |
| Fe | 19.0 | Fe |
| Si | 15.5 | SiO₂ |
| W | 3.8 | W |
| Ca | 14.0 | CaO |
| Al | 6.8 | Al₂O₃ |
| C | 3.2 | C |

This primary hearth product was used for the subsequent selective and final oxidation operations.

B. Selective Oxidation:

1. By Use of Hematite (Fe₂O₃)

A charge of 125 pounds of the crushed primary hearth product was blended with 11.5 pounds of hematite and 22 pounds of fluorspar and was melted in a small single-phase open-arc furnace which was lined with carbon paste. The arc was started on 2 pounds of steel punchings. After the charge had melted, 62.5 pounds of slag were first decanted and then 85 pounds of a magnetic secondary hearth product were raked from the furnace, crushed to ⅛ inch and smaller and passed over a magnetic pulley. The tapped slag contained only 1.55% Ta₂O₅ and 0.48% Nb₂O₅. The magnetic hearth product weighed 76.5 pounds and contained the following:

| component | percent | Expressed As |
|---|---|---|
| ta | 14.4 | Ta₂O₅ |
| Nb | 17.1 | Nb₂O₅ |
| Ti | 9.0 | TiO₂ |
| Fe | 38.4 | Fe |
| Si | 5.8 | SiO₂ |
| W | 4.1 | W |
| Ca | 7.2 | CaO |
| Al | 3.1 | Al₂O₃ |

The selective oxidation beneficiation step removed 77 percent of the silica, 50 percent of the titania, 69 percent of the lime and 72 percent of the alumina originally present in the primary smelted carbide hearth product.

2. By Use of a Tin Slag Concentrate

A charge of 125 pounds of the crushed primary hearth product was blended with 29.3 pounds of a Ta₂O₅–Nb₂O₅ tin slag concentrate containing 31.75% Ta₂O₅, 37.72% Nb₂O₅ and about 13% FeO, and with 22 pounds of fluorspar. The resulting mixture was melted in a small single-phase open-arc furnace which was lined with carbon paste. The arc was started on 2 pounds of steel punchings. After the charge had melted, 49 pounds of slag were decanted and 101 pounds of a magnetic hearth product were raked from the furnace, crushed to ⅛ inch and smaller and then passed over a magnetic pulley. The tapped slag contained 4.5% $Ta_2O_5$ and 0.3% $Nb_2O_5$. The magnetic hearth product weighed 96 pounds and contained:

| Component | Percent | Expressed As |
|---|---|---|
| Ta | 16.82 | $Ta_2O_5$ |
| Nb | 25.65 | $Nb_2O_5$ |
| Ti | 8.3 | $TiO_2$ |
| Fe | 34.0 | Fe |
| Si | 4.5 | $SiO_2$ |
| Ca | 4.1 | CaO |
| Al | 1.5 | $Al_2O_3$ |

The selective oxidation beneficiation step using a tin slag concentrate as the oxidant removed 78 percent of the silica, 42 percent of the titania, 78 percent of the lime and 84% of the alumina originally present in the primary smelted carbide hearth product.

3. By Use of Columbite

A charge of 3,840 grams of the crushed primary hearth product was blended with 1,140 grams of columbite ore containing 62.5% $Nb_2O_5$ and 6.9% $Ta_2O_5$ and was melted in a small magnesia crucible heated in an induction furnace. The contents were allowed to cool in the crucible. Good slag-metal separation was achieved. The resulting hearth product contained:

| Component | Percent | Expressed As |
|---|---|---|
| Ta | 6.9 | $Ta_2O_5$ |
| Nb | 29.6 | $Nb_2O_5$ |
| Ti | 5.0 | $TiO_2$ |
| Fe | 50. | Fe |
| Si | 3.9 | $SiO_2$ |
| Ca | 1.1 | CaO |
| Al | 0.2 | $Al_2O_3$ |

C. Final Oxidation

A charge of 120 pounds of a secondary hearth product from the selective oxidation step, containing 12.83% Ta and 17.44% Nb, both expressed as their pentoxides, was blended with 64 pounds of hematite and the mixture was melted in a small single-phase open-arc furnace which was lined with carbon paste. The arc was started on 2 pounds of steel punchings. After the charge had melted, 67 pounds of product slag were decanted and 91.5 pounds of waste alloy were poured from the furnace. The waste alloy contained 2.9% Ta and 1.5% Nb, both expressed as their pentoxides, and 5.9% W. The product slag contained 20.3% $Ta_2O_5$ and 25.7% $Nb_2O_5$.

To illustrate the advantage of the two-step oxidation operation using the selective oxidation beneficiation step of the invention over a single step oxidation operation, some of a primary smelted carbide hearth product was oxidized to a product slag in a single step using hematite as the oxidant. The results of several of each of these tests are compared in the following table with the product slags of the double-oxidation operations of the present invention using hematite as the oxidant in both steps:

|  | Original Tin Slag | Single Step product | Two Step Product |
|---|---|---|---|
| $Ta_2O_5$,% | 4 | 12.6 – 13.3 | 19.0 – 21.4 |
| $Nb_2O_5$,% | 4 | 13.1 – 14.8 | 24.1 – 25.7 |

I claim:

1. The method of beneficiating the tantalum and niobium oxide contents of an iron-bearing tin slag or other metallurgical by-product which comprises heating the tin slag in the presence of sufficient carbon to convert its tantalum and niobium oxides to a primary hearth product containing the tantalum and niobium as carbides in admixture with a carbon-containing iron alloy, separating oxidic gangue constituents from said primary hearth product, reacting said primary hearth product with a controlled amount of a selective oxidation reagent comprising a metal oxide having a free energy of formation more positive than that of silica such as to selectively oxidize any reduced titanium, silicon, calcium, aluminum and magnesium components of the tin slag present in the primary hearth product and to produce a beneficiated secondary hearth product containing the tantalum and niobium components of the primary hearth product, separating slagged oxidic gangue constituents from the resulting secondary hearth product, and then subjecting the secondary hearth product in a melting operation to the action of a final oxidizing reagent capable of oxidizing the tantalum and niobium of the secondary hearth product into a final product slag containing the tantalum and niobium in the form of their pentoxides.

2. The method according to claim 1 in which the selective oxidation reagent is an iron oxide.

3. The method according to claim 1 in which the selective oxidation reagent is a tin slag concentrate containing tantalum and niobium oxides.

4. The method according to claim 1 in which the selective oxidation reagent is an ore containing tantalum and niobium oxides.

5. The method according to claim 1 in which the final oxidizing reagent is an iron oxide.

6. The method according to claim 1 in which the final oxidizing reagent is oxygen.

* * * * *